United States Patent
Vora et al.

(10) Patent No.: US 10,949,255 B2
(45) Date of Patent: *Mar. 16, 2021

(54) COMPACT SCHEDULES FOR RESOURCE-CONSTRAINED DEVICES

(71) Applicant: Ayla Networks, Inc., Santa Clara, CA (US)

(72) Inventors: Jigar Vora, San Mateo, CA (US); Joseph R. Eykholt, Santa Clara, CA (US); Sudha Sundaresan, Saratoga, CA (US); Pablo Sebastián Rivera, Ciudad de Buenos Aires (AR); David Russell Friedman, Menlo Park, CA (US); Adrian Caceres, Los Gatos, CA (US)

(73) Assignee: Ayla Networks, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,592

(22) Filed: Jan. 23, 2019

(65) Prior Publication Data

US 2019/0155896 A1 May 23, 2019

Related U.S. Application Data

(63) Continuation of application No. 15/250,652, filed on Aug. 29, 2016, now Pat. No. 10,223,160.

(Continued)

(51) Int. Cl.
*G06F 9/48* (2006.01)
*G06N 20/00* (2019.01)
(Continued)

(52) U.S. Cl.
CPC ............ *G06F 9/4881* (2013.01); *G06F 9/542* (2013.01); *G06F 11/07* (2013.01); *G06F 40/205* (2020.01); *G06N 5/046* (2013.01); *G06N 20/00* (2019.01)

(58) Field of Classification Search
CPC .... G06F 17/2705; G06F 9/4881; G06F 9/542; G06F 11/07; G06N 5/046
See application file for complete search history.

(56) References Cited

U.S. PATENT DOCUMENTS

| 5,544,036 A | 8/1996 | Brown, Jr. et al. |
| 6,263,110 B1 | 7/2001 | Andrew et al. |

(Continued)

FOREIGN PATENT DOCUMENTS

WO    2014/176645 A1    11/2014

OTHER PUBLICATIONS

International Search Report and Written Opinion of the International Searching Authority for International application No. PCT/US2016/049502 dated Oct. 28, 2016.

*Primary Examiner* — Jacob D Dascomb
(74) *Attorney, Agent, or Firm* — Lowenstein Sandler LLP

(57) ABSTRACT

In an embodiment, a processing device receives an instruction to schedule an event associated with a remote target device, generates a schedule for the remote target device, and transmits the schedule to the remote target device. The processing device receives usage information from the remote target device and additional usage information from other remote devices. The processing device applies a machine learning algorithm to the usage information and the additional usage information to determine an update to the schedule. The processing device updates the schedule and sends the update to the remote target device.

18 Claims, 9 Drawing Sheets

Related U.S. Application Data

(60) Provisional application No. 62/212,454, filed on Aug. 31, 2015.

(51) Int. Cl.

| | | |
|---|---|---|
| *G06F 9/54* | (2006.01) | |
| *G06F 40/205* | (2020.01) | |
| *G06N 5/04* | (2006.01) | |
| *G06F 11/07* | (2006.01) | |

(56) References Cited

U.S. PATENT DOCUMENTS

| | | |
|---|---|---|
| 7,010,762 B2 | 3/2006 | O'Neil |
| 7,895,347 B2 | 2/2011 | Schneider |
| 8,166,145 B2 | 4/2012 | Tran et al. |
| 8,805,955 B2 | 8/2014 | Suchý |
| 8,819,713 B1 | 8/2014 | Chaudhry et al. |
| 9,946,571 B1 * | 4/2018 | Brown ............... G06F 9/4893 |
| 2007/0260446 A1 | 11/2007 | Suba et al. |
| 2012/0203379 A1 * | 8/2012 | Sloo .................. G05D 23/1902 700/276 |
| 2013/0254219 A1 * | 9/2013 | Zhang ............... G06F 17/2705 707/755 |
| 2014/0019891 A1 | 1/2014 | Borah |
| 2014/0136269 A1 | 5/2014 | Wasser |
| 2014/0317029 A1 * | 10/2014 | Matsuoka ............ G05B 15/02 706/12 |
| 2015/0205614 A1 * | 7/2015 | Lahteenmaki ............ G06F 8/47 712/215 |
| 2015/0276238 A1 * | 10/2015 | Matsuoka ............ G05B 15/02 700/278 |
| 2015/0324568 A1 * | 11/2015 | Publicover ............ G06F 3/017 726/19 |
| 2015/0378861 A1 | 12/2015 | Deshpande et al. |

* cited by examiner

COMPACT SCHEDULES FOR RESOURCE-CONSTRAINED DEVICES

RELATED APPLICATIONS

The present application is a continuation of U.S. patent application Ser. No. 15/250,652 filed Aug. 29, 2016, which claims the benefit of U.S. Provisional Patent Application No. 62/212,454 filed Aug. 31, 2015, both of which are incorporated by reference herein.

BACKGROUND

Many modern appliances, consumer devices, and other devices include embedded systems that are configured to perform one or more dedicated functions. However, most embedded systems of such devices do not include network connectivity, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Moreover, a growing number of traditionally dumb and smaller devices have been equipped with network connectivity using simple embedded systems that lack computing resources to perform local processing beyond a dedicated function. Absent network connectivity, such devices are unable to receive instruction. Accordingly, some utility of such devices may be lost when network connectivity is limited or unavailable.

BRIEF DESCRIPTION OF THE DRAWINGS

Reference will now be made to the accompanying drawings showing example embodiments of the present application, and in which.

DETAILED DESCRIPTION

Figure 1:
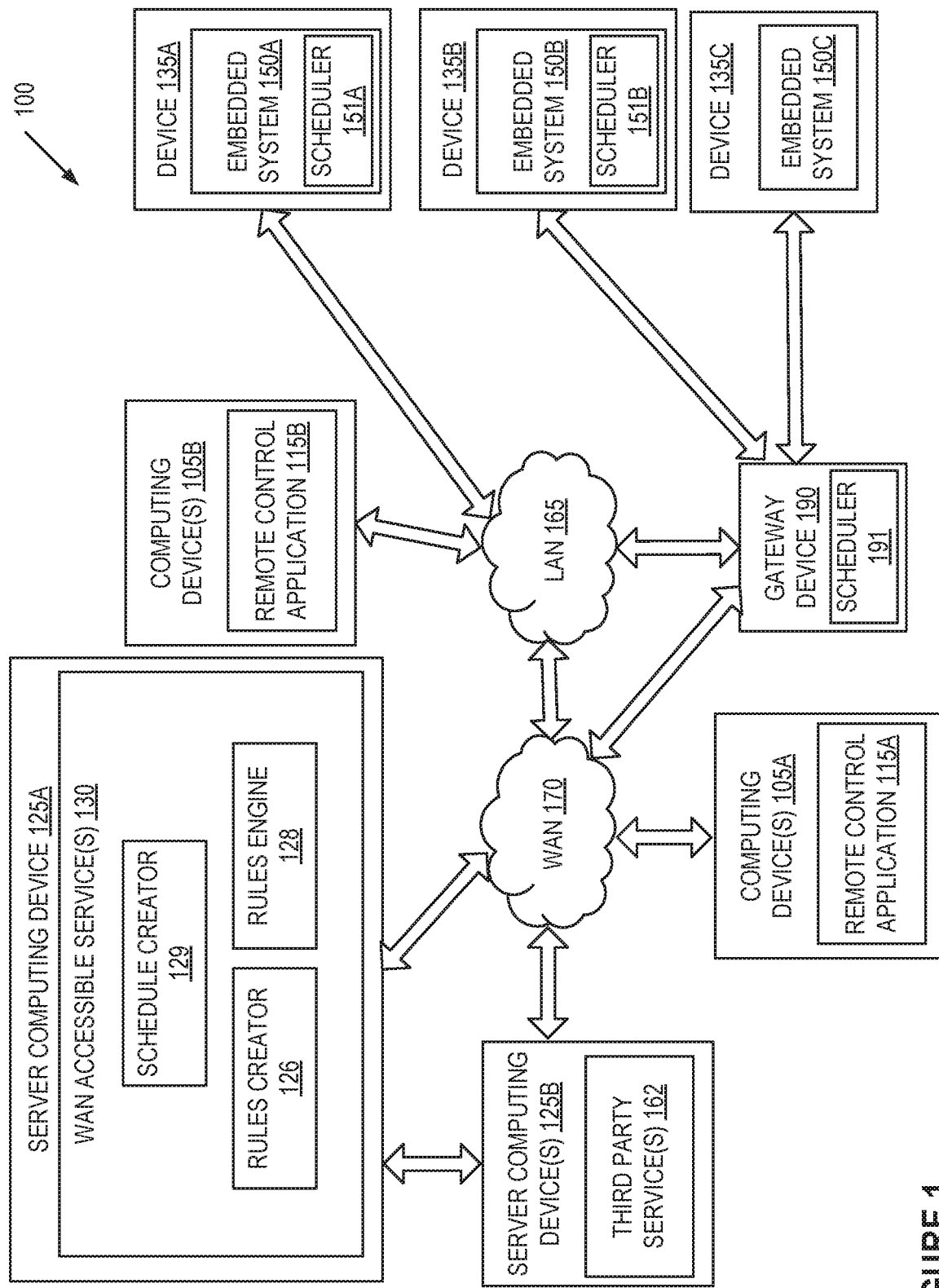
FIG. 1 is a block diagram depicting an example network architecture including remotely accessible devices and computing devices that interact with the remotely accessible devices.

Embodiments are directed to a network-connected device platform (also referred to as an Internet-of-things (IoT) cloud platform or simply an IoT platform) that generates a schedule for a remote device that can be used to execute events on the remote device even in the absence of a network connection.

Remotely managing scheduled events for a device may be done by a cloud server and/or service that sends commands to the device at the times the events are scheduled to execute. In such an implementation, the device is dependent on connectivity to the cloud server to continue coordinated functionality, such as executing scheduled events. However, network connections are susceptible to outages, lag, signal drop off, and dead zones. Accordingly, for such systems that maintain a schedule in the cloud, schedule reliability may be compromised in some instances.

Some embodiments address the problems that can arise when the remote device that has scheduled behavior becomes disconnected from the cloud and is unable to receive messages for scheduled events. By generating a schedule in a compact format that can be understood by embedded systems of remote devices with limited resources, and storing the schedule on the remote devices or on a gateway device that controls the remote devices, embodiments allow the remote devices to execute events (also referred to as actions) even when disconnected from the cloud (e.g., from a wide area network (WAN) such as the Internet).

Embodiments of the present invention are directed to generating a schedule for a remote device and translating the schedule into a compact format. The translated schedule may then be transmitted to the remote device. The remote device may be an endpoint device having an embedded system or may be a gateway device that manages such an endpoint device. In an embodiment, the remote device stores the received schedule in local memory. The remote device may then parse the schedule to identify one or more events, and execute a scheduled event or action at a specified time. Since the remote device stores the schedule, the scheduled event may be executed at the appropriate time even in the absence of a network connection to the cloud server or service. A scheduled event or action for a device can cause the device to execute one or more commands and perform an operation at a specified time. For example, a scheduled event can cause a washing machine to run a rinse cycle at a certain time of day. Other examples of device operation include changing a setting of a device, enabling or disabling a device or function, and so on. Schedules can be periodically received and updated when connectivity to the cloud server is available. Events can also be scheduled to repeat and coordinated to execute with events of other devices via a synchronized timing signal.

The cloud server (also referred to simply as a server computing device) can include a processing device executing a schedule creator that receives an instruction to schedule an event on a remote device. The instruction can come from various sources with different formats (e.g., via an application programming interface (API) provided by the cloud server) and include a complex set of details understood by the cloud server. The cloud server may generate a schedule for the remote device and translate the schedule into a compact format that the remote device can understand and store locally. The translated schedule may be transmitted to the remote device when a connection is available. Then the remote device hosting a scheduler module may parse the translated schedule to generate a command for a device operation at a specified time. Thus, a user may configure a schedule that will cause a remote device to execute a command to perform an action at a specified time even in the absence of a network connection at the specified time. The command may be executed to perform the action automatically, whether or not the server or service that provided the schedule can communicate with the remote device.

Additionally, in an embodiment, a schedule may be implemented for a remote device that lacks resources to host a scheduler by a gateway device, which may manage scheduled events for one or more remote devices. In this embodiment, the gateway device locally stores the schedule, parses the schedule for event information, and transmits a command to the remote device to execute the event even in the absence of a connection to the cloud server.

IoT web services generally allow for a coordinated schedule of events to be performed on a single device or a group of devices. Embodiments of the present invention enable a device to execute a coordinated schedule of events even in the absence of a connection to a cloud server. In an embodiment, a time signal is sent to synchronize internal timers of multiple remote devices that can each execute coordinated scheduled events based on the synchronized time signal. By implementing an adaptable scheduling scheme that is programmed by a cloud service and implemented by remote devices, embodiments provide a reliable scheduling system for embedded systems.

Referring now to the figures, FIG. 1 is a block diagram depicting an example network architecture 100 including remotely accessible devices 135A-C and computing devices 105-B, 125A, 125B that interact with the remotely accessible devices 135A-C. The network architecture 100 includes the multiple devices 135A-C connected to a local area network (LAN) 165. Thus, the devices 135A-C may be referred to as network-connected devices or remote target devices. Some of the devices 135B-C lack connectivity to an Internet protocol (IP) network, and thus connect to the LAN 165 and computing devices 105A-B, 125A, 125B via a gateway device 190.

In one embodiment, the devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices or remote target devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Some devices 135C have with fewer components that limit functionality of the emended system 150C. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165, to gateway device 190, or to a wireless carrier network (e.g., that is implemented using various data processing equipment, communication towers, etc.). The communication module may be configured to manage security, manage sessions, manage access control, manage communications with external devices, manage internal modules, manage an internal timer, and so forth. In an embodiment, the communication module can be used to receive a data, such as a schedule from a server computing device 125A-B or a schedule and/or commands from the gateway device 190 during a period of connectivity. The communication module may store the schedule and perform scheduled events based on the schedule.

In one embodiment, the communication module of embedded system 150A is configured to communicate using Wi-Fi® or another Internet protocol (IP) such as Ethernet. Communication modules may also be configured to communicate with a wireless carrier network using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150B-C may not support any of the communication types supported by the network device. In one embodiment, the communication modules of embedded systems 150B-C do not include IP network adapters (e.g., Wi-Fi adapters or Ethernet adapters), and are not capable of directly connecting to LAN 165. Instead, the communication modules of embedded systems 150B-C may be configured to communicate using Bluetooth®, ZigBee®, power line communication (PLC), or other communication protocols. For example, devices 135B-C may support ZigBee or Bluetooth. ZigBee is a collection of wireless mesh network protocols. Bluetooth is a frequency-hopping spread spectrum (FHSS) wireless communication protocol that uses short-wavelength ultra-high frequency (UHF) radio waves in the industrial, scientific and medical (ISM) radio band from 2.4 to 2.485 GHz. To enable such devices to connect to the LAN 165, the LAN 165 includes gateway device 190 connected to the network device via one of the connection types supported by the network device (e.g., via Ethernet or Wi-Fi). Alternatively, the network device of the LAN 165 and the gateway device 190 may be combined into a single device.

In addition to supporting TCP/IP protocols, the gateway device 190 may additionally support other communication protocols such as ZigBee, BACnet, PLC and/or Bluetooth, and may translate between supported communication protocols. Accordingly, some devices (e.g., devices 135B-C) may connect to the LAN 165 and/or to the WAN 170 through the gateway device 190. In one embodiment, gateway device 190 includes one or more IP network adapters (e.g., Wi-Fi adapters, Ethernet adapters, etc.) and one or more type of non-IP network adapters (e.g., one or more network adapters for ZigBee communications (referred to as a ZigBee gateway), one or more network adapters for Bluetooth communications (referred to as a Bluetooth gateway), etc.). The gateway device 190 may manage a network of devices that includes multiple devices 135B-C that use one or more communication protocols.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

Computing devices 105A-B may include portable devices such as electronic book readers, portable digital assistants, mobile phones, smart phones, laptop computers, portable media players, tablet computers, cameras, video cameras, netbooks, notebooks, and the like. Computing devices 105A-B may also include traditionally stationary devices such as desktop computers, gaming consoles, digital video disc (DVD) players, media centers, and the like. Computing devices 105A-B may connect to the WAN 170, to the LAN 165 and/or to another LAN (not shown). As shown, computing devices 105A are connected to the WAN 170 and computing devices 105B are connected to the LAN 165, and through the LAN 165 to WAN 170 and server computing device 125A.

Computing devices 105A-B may include a remote control application 115A-B (or multiple remote control applications) that can receive information for devices 135A-C via virtual devices (not shown) and schedule events to change the state of the devices 135A-C via schedule creator 129. The remote control applications 115A-B may be programmed to run on various operating systems, such as Windows® operating systems, Unix® operating systems, iOS® operating systems, Android® operating systems and Java® operating systems to name a few. The remote control applications 115A-B may also be configured as firmware, or as hardware, or as some combination of software, firmware and/or hardware. The remote control applications 115A-B may include a graphical user interface (GUI) that enables users to interact with and schedule creator 129 in an intuitive and user-friendly manner. A user may interact with the GUI to cause the remote control application to generate instructions to schedule events for the devices represented in the GUI. In one embodiment, the remote control applications 115A-B access an schedule creation API provided by the schedule creator 130 to generate and/or edit schedules, The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing devices 125B can include one or more third-party services 162. Third-party services 162 may be services provided by entities other than a provider of an IoT platform that includes WAN-accessible services 130. As shown, server computing devices 125B may connect to server computing device 125A directly or via WAN 170. Examples of third-party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an original equipment manufacturer (OEM) hosted service that keeps track of customer payments (e.g., usable to turn off device controls if payment is not received), and so on. Third-party services 162 may additionally include third-party IoT cloud services. For example, WAN-accessible services 130 may interface with a Nest® thermostat cloud service for receiving information about a Nest thermostat of a user. For actions involving external services, a user may enter their credentials or go through an authorization procedure to provide authorization to perform actions on the user's behalf with regards to the external services.

Server computing device 125A hosts one or more WAN-accessible services 130, which may be a web based service and/or a cloud service (e.g., a web based service hosted in a cloud computing platform). A WAN-accessible service 130 may maintain a session (e.g., via a continuous or intermittent connection) with one or more of the embedded systems 150A-C and/or with gateway device 190. Alternatively, the WAN-accessible service 130 may periodically establish sessions with the embedded systems 150A-C and/or gateway device 190.

Connections are susceptible to outages, signal drop off, and dead zones, which may make WAN-accessible service 130 inaccessible to the embedded systems 150A-C and gateway 190 at times. Sessions and connections may be between a virtual device (not shown) running on the server computing device 130 and the devices 135A-C. Sessions and connections may also be established between a virtual gateway device (not shown) running on the server computing device 130 and gateway device 190. Communications between virtual devices and devices 135B-C may be facilitated by gateway device 190.

WAN-accessible services 130 may maintain up-to-date information on the devices 135A-C, and such up-to-date information may be reflected in a virtual device (not shown). Accordingly, values, states and other information of the embedded systems 150A-C may change based on environmental conditions of the embedded systems and reflected in the virtual device of the WAN-accessible service 130.

In one embodiment, WAN-accessible services 130 include a schedule creator 129. Schedule creator 129 is responsible for creating and updating one or more schedules for schedulers 151A-B of devices 135A-B and/or for scheduler 191 of gateway device 190. In one embodiment, schedule creator 129 receives instructions to generate or update a schedule. The received instructions may include a request to schedule a new event, and may come from various sources, such as devices 135A-C, computing device 105, third-party services 162, other WAN-accessible services 130, or other internal logic. For example, instructions may be received from remote control applications 115A-B via a provided API or from a web interface. The schedule creator 129 can receive instructions from multiple input feeds, where each input feed is associated with a source (e.g., third-party services 162, embedded systems 150A-C, WAN-accessible services 130, etc.). Each of these input feeds may be sources of input that may provide detailed instructions in different formats to schedule a series of events or update a schedule. The schedule may be created by specifying parameters for the schedule, whether to use UTC or local time, as well as specific actions to perform. Scheduled actions may be represented by key value pairs including a property (key) and a setting (value).

Schedule creator 129 generates a schedule for one or more devices 135A-C using the input received from the one or more sources. The schedule may specify in detail properties such as a schedule version, days that the schedule is applicable, times to start and stop actions, durations of actions, etc. The schedule may also specify actions to perform, specifics on how to perform the actions, devices on which to perform the actions, values associated with the actions, rules to activate, trigger or deactivate, other schedules to enable, modify or disable, and so on. Schedule creator 129 translates the schedule into a compact format, which is described in greater detail below. The compact format consumes minimal network bandwidth during transmission and similarly consumes minimal storage resources on the devices 135A-C and/or gateway device 190. Schedule creator 129 then transmits the compact schedule to a remote target device 135A-C or gateway device 190. The remote target device 135A-C or gateway device 190 can then store the compact schedule and execute commands to perform actions from the schedule at certain times or within certain time periods even in the absence of a network connection between the WAN-accessible services 130 and the LAN 165.

WAN-accessible services 130 can include a rules engine 128 and a rules creator 126. Rules engine 128 applies one or more rules to determine actions and generate messages and/or commands to implement the determined actions based on received events. The rules engine 128 may at any time receive notifications of events from any of devices 135A-C, third-party services 162 or other WAN-accessible services 130. The rules engine 128 includes multiple input feeds, where each input feed is associated with a source (e.g., third-party services 162, embedded systems 150A-C, WAN-accessible services 130, etc.). Each of these input feeds may be sources of data that may satisfy conditions specified in rules. One source may be another schedule. For example, a schedule may specify when to apply or not apply a particular rule. A triggered notification rule may, for example, send an email, send a text message, call a phone number, etc.

The rules engine 128 may then determine whether the data satisfies criteria that trigger one or more events to schedule on remote target devices 135A-C, WAN-accessible services 130 and/or third-party services 162. Responsive to determining that a received data satisfies criteria of a rule, rules engine 128 may generate an instruction for the schedule creator 129 to schedule an event for a device 135A-C, WAN-accessible service 130 or third-party service 162 associated with an output of the rule. Additionally, rules may cause schedule creator 129 to enable or disable schedules or specific events in schedules.

In an embodiment, the embedded systems 150A-B may each include a scheduler 151A-B that enables the embedded system 150A-B (and thus the device 135A-B) to maintain a schedule to execute scheduled events even in the absence of network-connectivity. Remote target devices 135A-B can use a small amount of memory to locally store the received schedule.

Absence of network-connectivity can refer to the embedded system 150A-C (and thus the device 135A-C) being disconnecting from a LAN 165, gateway device 190, or WAN 170. For example, when embedded system 150A is disconnected from LAN 165, then scheduler 151A-B may maintain an internal timer and execute one or more event at a specified time based on the stored schedule. For embedded systems 150A-C that lack an internal clock, the scheduler 151A-B may be configured to manage an internal counter (not shown) based on a time signal to execute functionality at a specified time.

In another example, when the embedded systems 150B-C is connected to gateway device 190 but unable to communicate via the LAN 165 or a WAN 170 (e.g., is disconnected from a server computing device 125A-B, etc.), then the scheduler 191 of the gateway device 190 can maintain a schedule to execute the event on the device 135B-C at a specified time.

The scheduler 151A-B, 191 may store a compact schedule received from schedule creator 129. The schedule may include parameters such as version number, dates, times, etc. as well as instructions for commands or actions that can change a state of one or more properties or attributes of a device 135A-C controllable by an embedded system 150A-C. For example, if the embedded system 150A-C is embedded in a heater or thermostat, then scheduler 151A-B, 191 can issue a command to increase or decrease a temperature at a time specified in the schedule. In another example, if the embedded system 150A-C is embedded in a home automation system, then scheduler 151A-B, 191 can generate commands to turn on, dim, brighten, or turn off a set of lights at scheduled times. In another example, device 135A is a washing machine controlled by embedded system 150A, and scheduler 151A includes a schedule that specifies when to run a wash cycle.

For devices 135C having embedded systems that lack resources to locally host a scheduler, scheduler 191 of the gateway device 190 can maintain the device schedule for device 135C. For example, a retrofitted heating device may not be equipped with sufficient computing resources to store and host the scheduler. Accordingly, scheduler 191 may manage a schedule for the heater and generate a command to cause the embedded system 150C to adjust the temperature setpoint at a scheduled time.

To implement a schedule, scheduler 151A-B, 191 stores the received schedule and parses the schedule (having the compact format) to identify scheduled events. By parsing the schedule, scheduler 151A-B, 191 identifies parameters that at least specify the time and date and identifies a device action (e.g., operation of the washing machine). For schedules stored by gateway device 190, the parameters also include an identity of a device associated with the event or schedule. Additionally, in one embodiment event information included in the compact schedule may include specific packets to use to create a command to cause an action included in the action. Scheduler 191 may use such data to generate the command and send the command to the device 135B-C at the specified times associated with an event.

Therefore, even when the network connection (e.g., WAN 170 or LAN 165) fails (e.g., during a snowstorm), the schedulers 151A-B, 191 will still generate commands that cause embedded systems 150A-C to execute scheduled events at the specified times independent of a triggering command being received from WAN 170.

There are innumerable other use cases for which schedules may be generated by the schedule creator 129 and applied by the scheduler 151A-B, 191. The schedule creator 129 is discussed in greater detail below.

Figure 2A:
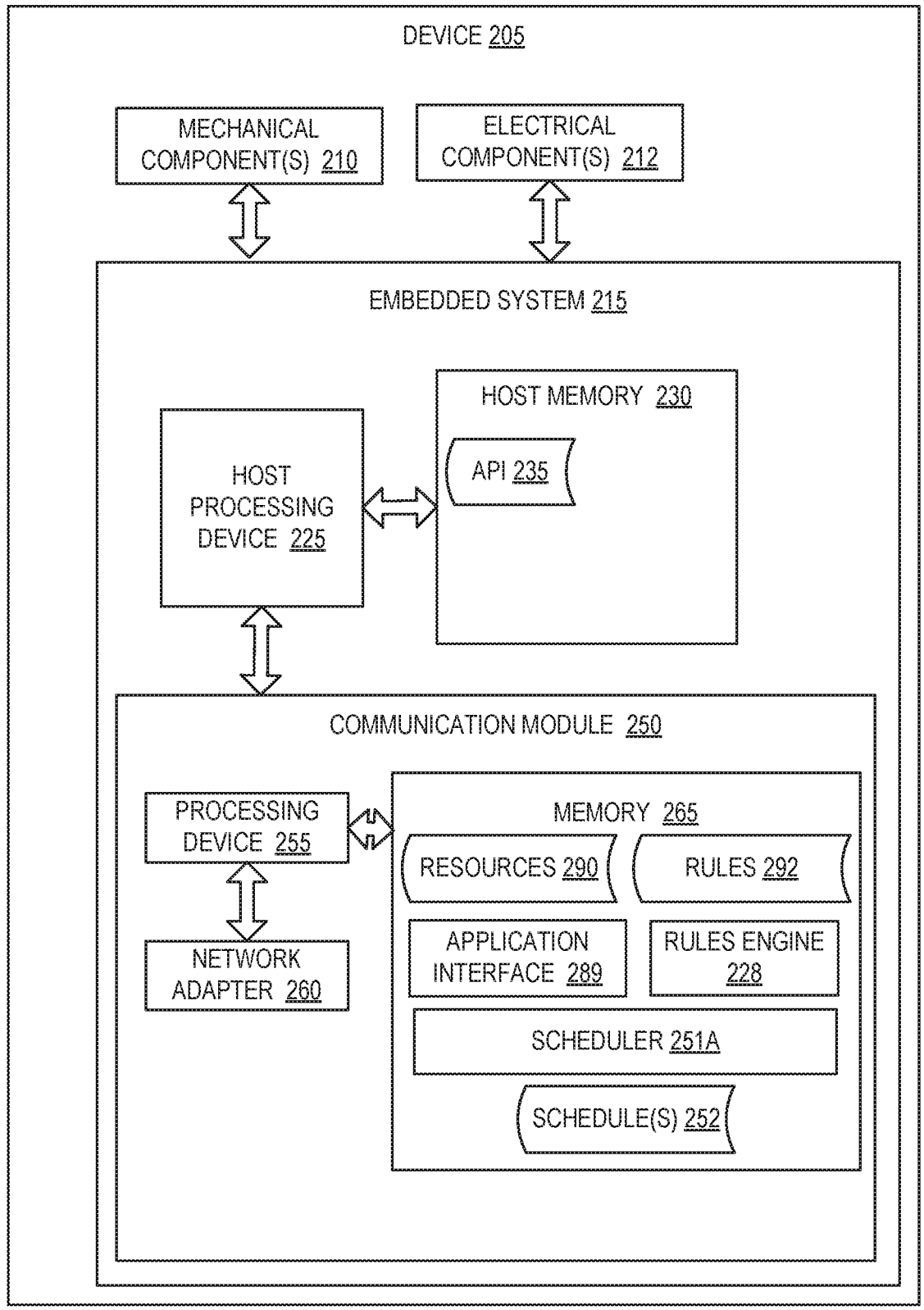
FIG. 2A is a block diagram of an example device having an embedded system, in accordance with one embodiment of the present invention.

FIG. 2A is a block diagram of an example device 205, in accordance with one embodiment of the present invention. The device 205 may include any of the aforementioned types of devices having an embedded system 215, and in one embodiment corresponds to a device 135A-B of FIG. 1. In one embodiment, the device 205 includes mechanical components 210, electrical components 212 and an embedded system 215. The electrical components 212 and/or mechanical components 210 may include sensors, programmable logic controllers (PLCs), switches, motors, valves, actuators, and so forth.

The embedded system 215 may include a host processing device 225, a host memory 230 and/or a communication module 250 coupled to the host processing device 225. The embedded system 215 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 225 may be a microcontroller or a digital signal processor (DSP) in one embodiment. Host processing device 225 may alternatively or additionally include a programmable logic controller (PLC), a field programmable gate array (FPGA) or a complex programmable logic device (CPLD). The host processing device 225 may be configured to perform specific functions related to the operation and control of the device 205.

Host memory 230 may include random access memory (RAM), read only memory (ROM), one time programmable (OTP) ROM, Flash (e.g., NOR Flash), or other types of memory. Host memory 230 may store an application programming interface (API) 235 for the communication module 250. The API 235 may enable the host processing device 225 to receive commands and/or data and to send commands and/or data via communication module 250 during periods of network connectivity. Host memory 230 may also include firmware for the host processing device 225 that configures the host processing device to perform one or more operations that are specific to device 205.

In some embodiments, the host memory 230 may be integrated into the host processing device 225. For example, microcontrollers typically include a processor core, memory and programmable input/output peripherals. Accordingly, if the host processing device 225 is a microcontroller, then host memory 230 may be a memory of host processing device 225.

Communication module 250 may be an integrated circuit (IC) that is configured to be coupled to host processing device 225 of embedded system 215. Communication module 250 may be provided by a third-party to a manufacturer of the device along with the API 235, and may enable network capability and remote scheduling capability to be easily added to the device 205. The communication module 250 may include its own processing device 255, a memory 265 and/or a network adapter 260. The processing device 255 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 265 is integrated into processing device 255.

Memory 265 may store data identifying one or more resources (e.g., parameters, attributes and data) of the device 205. Memory 265 may store firmware that includes instructions for a remote interface 289. In an embodiment, a scheduler 251A can be stored in memory 265 with received schedule(s) 252 to execute scheduled events as described herein. Schedule(s) 252 may be received in a compact format to allow for efficient storage in memory 265. Scheduler 251A may be executed by processing device 255. Alternatively, scheduler 251A may be stored in host memory 230 and executed by host processing device 225.

The schedule 252 may have a compact format that is different from a format that the schedule was originally created in. The schedule may have been translated to the compact format with assigned encodings for parameters by a schedule creator to conserve memory 265. Scheduler 251A may include an internal table, dictionary, cipher or other encoding data that is used to interpret the schedule in its compact format. Both the schedule creator and the scheduler 251A may retain a copy of the same encoding data, which may serve as an agreement between the device 205 and the schedule creator as to how each of the parameters and/or actions of the schedule are to be encoded. This decoder may indicate meanings of specific bytes and bits of information in the schedule. For example, a first byte may represent a version number, a second byte may represent days that the schedule is valid, one or more subsequent bytes may represent time, and a subsequent byte may represent an action to perform. In one embodiment, the compact schedule is a string (e.g., binary string). For example, the schedule may be a JavaScript object notation (JSON) encoded string or an extensible markup language (XML) string that can be parsed and decoded by scheduler 251A. The schedule may alternatively be encoded as protocol buffers, raw binary, or other binary format. One example schedule is provided below with reference to FIG. 3. Accordingly, the schedule in the compact format is understood by both the schedule creator of the server computing device and scheduler 251A.

Scheduler 251A includes processing logic that when executed by the host processing device 225 parses the schedule(s) 252 to identify at least event information for a scheduled event. The scheduled event may include an operation to change a state of the device 205 at a specified time. The event information can include a determined change to a device state, a start time, an end time, a duration, a frequency, a time signal, and/or other information. Host processing device 225 may determine a command or property update and a start time based on parsing the schedule, and may initiate a timer that will cause the command or property update to be executed at a particular time (e.g., when the timer times out or when a particular time is reached). When the event triggers (the designated time is reached and the property update is performed), scheduler 251A may again parse the schedule to determine a next scheduled event and start a new timer. This process may be repeated each time an event is triggered. The scheduler 251A may periodically receive a time signal from a WAN-accessible service, which may be used to synchronize an internal timer of the device 205 with the source of the received schedule or other external timer (e.g., with a cloud service). Additionally, device 205 may periodically receive updated and/or new schedules 252.

In an embodiment, the embedded system 215 lacks an internal clock. Such an embedded system 215 may keep track of time by counting numbers of processor cycles (referred to as ticks). Accordingly, when scheduler 251A receives a synchronization signal, scheduler 251A may compute a number of ticks associated with a time reported in the synchronization signal. In one embodiment, scheduler 251A counts back to a time associated with when the device was started (click number 1), and records the time associated with that click count.

Scheduler 251 may know the number of clicks that occur in a second. Accordingly, to set a timer, scheduler 251A may calculate a click count that will occur at a time of a scheduled event. The timer may then cause the event to trigger (e.g., the attribute update to be performed) when the present click count reaches the click count set in the timer.

In some instances, the click count may reach a maximum value, after which the click count resets to zero. If this occurs, scheduler 251A may use the last received synchronization information to determine a time at which the click count was reset, and may update the time associated with click 1 accordingly.

In one example, device 205 is a washing machine, and scheduler 251A generates a command to cause the embedded system 215 to activate a wash cycle for the washing machine at a scheduled time identified in schedules 252 (e.g., at midnight). Thus, even if a network connection is lost during the evening, the embedded system 215 will still start the wash cycle independent of a triggering command being received from a WAN service.

In one embodiment, memory 265 stores a rules engine 228 and one or more rules 292. The rules engine 228 may be similar to rules engine 128, but with reduced functionalities and a smaller memory footprint. Rules engine 228 may activate and/or deactivate schedules or specific events of schedules based on the rules 292 and/or may enable, disable or trigger specific rules in accordance with schedules events.

Network adapter 260 may be a wired network adapter (e.g., an Ethernet adapter) or a wireless network adapter (e.g., a Wi-Fi adapter or other wireless local area network (WLAN) adapter). Network adapter 260 may also be configured to provide connection to a network or other devices (e.g., to a gateway device) using Zigbee®, power line communication (PLC), Bluetooth®, 6LowPAN, or other communication protocols. Network adapter 260 may receive schedule(s) 252, notifications, and other messages from a WAN-accessible service during periods of network connectivity. Network adapter 260 may additional send outgoing messages to the WAN-accessible service, such as notifications that property updates have been performed as scheduled.

Figure 2B:
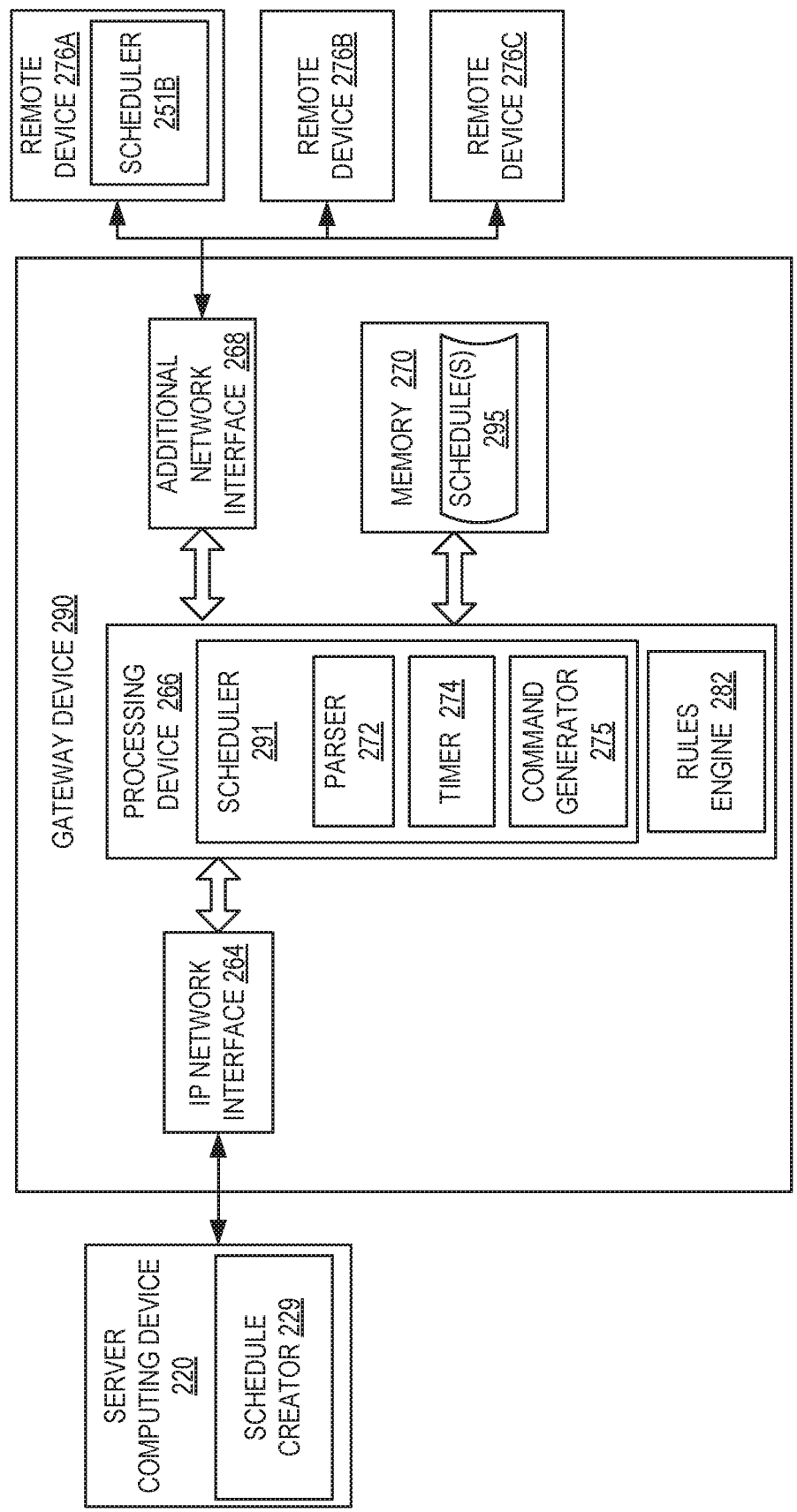
FIG. 2B is a block diagram of an example gateway device, in accordance with one embodiment of the present invention.

FIG. 2B is a block diagram of an example gateway device 290. The gateway device 290 manages multiple remote devices 276A-C. A server computing device 220 provides WAN-accessible services including a schedule creator 229 that may create and provide schedules to gateway device 290.

Gateway device 290 includes an IP network interface 264, a processing device 266, one or more additional network interfaces 268, and a memory 270. Gateway device 290 may also include other components not described herein. IP network interface 264 (also referred to as an IP network adapter) receives messages from, and sends messages to, a server computing device 220 over a WAN and/or LAN during periods of network connectivity. Such messages may include one or more compact schedules 295, which gateway device 290 may store in memory 270. IP network interface 264 may be, for example, an Ethernet network adapter, a Wi-Fi network adapter, and so on.

The one or more additional network interfaces 268 may be wireless or wired adapters that are used to communicate with devices 276A-C managed by gateway device 290. Additional network interfaces 268 may include a ZigBee module, a Bluetooth module, a power line communication (PLC) module, and/or other wired or wireless communication modules.

Processing device 266 is connected to IP network interface 264, additional network interface 268 and memory 270. Processing device 266 may represent one or more general-purpose processors such as a microprocessor, central processing unit, or the like. Processing device 266 may also be one or more special-purpose processing devices such as an application specific integrated circuit (ASIC), a field programmable gate array (FPGA), a digital signal processor (DSP), network processor, or the like. Processing device 266 is configured to maintain the schedule and execute commands for performing the operations associated with the event and steps discussed herein.

Some devices 276A may include their own scheduler 251B. Other devices 276B-C may not be capable of supporting their own scheduler. IP network interface 264 receives one or more translated schedules (also referred to as a compact schedules 295) from schedule creator 229 of the server computing device 220 during periods of network connectivity. Processing device 266 of gateway device 290 may store received schedules 295 in memory 270 and/or may forward the received schedules to devices 276A-C. In one embodiment, gateway device 290 stores schedules associated with devices 276B-C that do not have their own scheduler and forwards schedules associated with devices 276A that have their own scheduler 251B to those devices 276A. Thus, gateway device 290 may implement schedules 295 for devices that are not capable of implementing their own schedules.

In one embodiment, gateway device 290 stores a separate schedule for each managed device that lacks its own scheduler (e.g., for devices 276B-C). Alternatively, a single schedule may include events for multiple devices.

Processing device 266 of gateway device 290 can execute a scheduler 291. The scheduler 291 may also reside in memory 270, and may be loaded into processing device 266 during operation of gateway device 290. Memory 270 may include volatile and/or nonvolatile memory devices, such as Flash, random access memory (RAM), read only memory (ROM), and so forth. In one embodiment, scheduler 291 includes a parser 272, a timer 274, and/or a command generator 275. In another embodiment, the scheduler 291 may be separate from the parser 272, the timer 274, and/or the command generator 275.

Parser 272 parses a schedule to identify event information in the received schedules 295. Parser 272 may use encoding data that identifies meanings associated with specific bytes in the schedules 295, and so enables the scheduler 291 to "understand" the schedules 295. As used herein, the term "understand" as applied to the scheduler 291 means that the scheduler is able to interpret the meanings of the contents such as event information (e.g., parameters) of the schedule 295 (e.g., can associate meanings to specific bytes of the schedule). Parser 272 can parse the a schedule 295 to determine, for example, an event, a time of the event, a day of the event, one or more commands associated with the event, a duration of the event, and so on.

Timer 272 sets a time for a next scheduled event for a device 276A-B, and may temporarily record information associated with the event. This may include setting a timer. Recorded information about an event may include one or more commands to generate, a device to send the commands to, a duration of the event, one or more commands to generate when the duration is over, and so on. When the timer 274 determines that a scheduled event should be triggered, timer 274 notifies command generator 275.

The command generator 275 can use recorded event information to generate one or more commands. The generated command is to cause an action (e.g., change, disable, adjust, activate, etc.) to be performed on a device (e.g., for an attribute update). The command may include a unique identifier (e.g., MAC address) of a device 276B-C, one or more packets that may make up the command, an identifier of an attribute that is to change, a value for the attribute, and so on. Gateway device 290 then sends the command to the appropriate device 276B-C using one of the additional network interfaces 268 (e.g., wireless interfaces). For example, the gateway device 290 can issue, at the specified time, a command for the remote device 276B to update an attribute (e.g., to turn on or off, to change a temperature set point, and so on). In the example of a ZigBee device, the command can also include a cluster identifier of a cluster whose attribute is to be modified.

Gateway device 290 may include a rules engine 262 and/or one or more rules (nor shown) that dictate circumstances under which certain schedules 295 should be enabled or disabled. Additionally, a parameter of an event may specify that a rule is satisfied/triggered, or that a rule is to be enabled or disabled. While a schedule is disabled, no events in that schedule may be triggered. Alternatively, particular events in a schedule may be disabled rather than disabling the entire schedule. For example, remote device 276B may be an external thermometer, and remote device 276C may be a thermostat. Gateway device 290 may include a rule that specifies that a heater should not be turned on if the external thermometer registers a temperature above a temperature threshold. In such an instance, scheduler 291 may disable a scheduled event to turn on the heater for the device 276C. Gateway device 290 may also receive notices to enable or disable one or more schedules 295 or specific events of the one or more schedules 295 from server computing device 220, and may act accordingly. Additionally, some schedules may have scheduled events to activate, deactivate or modify other schedules.

Figure 3:
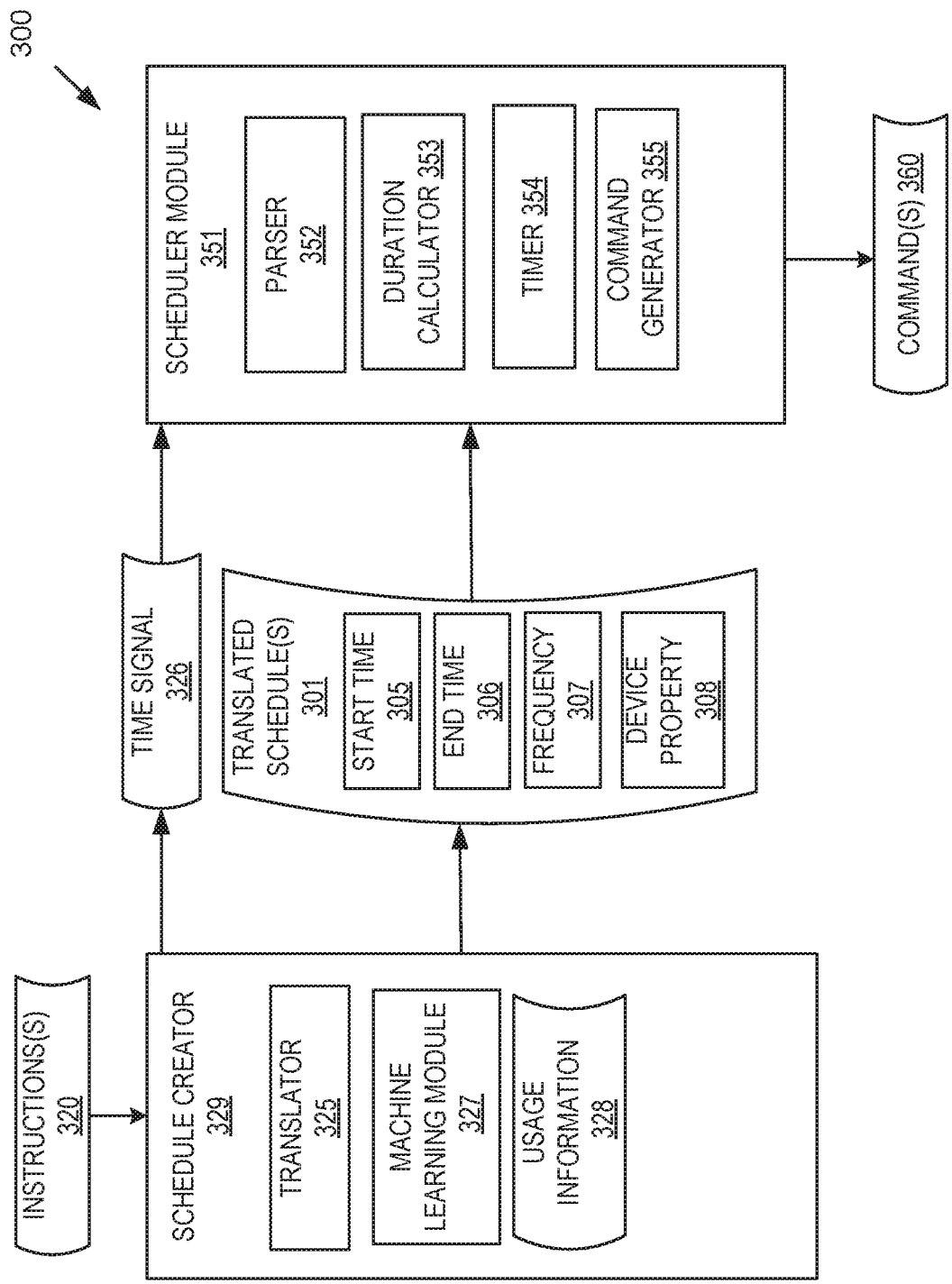
FIG. 3 is a block diagram depicting interactions of a schedule creator module and scheduler module to translate a schedule for a remote device.

FIG. 3 is a block diagram depicting interactions of a schedule creator 329 and scheduler module 351 regarding transmission of a compact schedule. In one embodiment, schedule creator 329 corresponds to schedule creator 129 of FIG. 1. Schedule creator 329 includes functionality for generating a schedule, translating the schedule into a compact format that can be interpreted by scheduler module 351 residing on an endpoint device or gateway device (e.g., schedulers 151A-B, 191 of FIG. 1), and transmitting the schedule to the scheduler module 351. The schedule creator 329 may include a translator 325 and/or a machine learning module 327. The schedule creator 329 may be a WAN-accessible service executing on a server computing device (e.g., server computing device 125 of FIG. 1).

The compact format used for the translated storage occupies less storage on a remote target device, which allows a greater number of events to be stored and executed locally during prolonged periods of communication failure, thereby increasing reliability of the scheduling system hosted locally on embedded systems. Employing a predefined scheme of parameters for the schedule allows the embedded systems to parse the received data, locally execute the schedule, and trigger an operation at a specified time on a device without network connectivity.

The schedule creator 329 may receive scheduling instructions 320 from various sources, such as a user device, third-party service, or machine learning module 327. The received instructions can include information to schedule multiple events for one or more devices. For example, a user can specify a time for a light to turn on and a time for the light to turn off using a mobile application or website interface. The instruction may be received via an API of the schedule creator 329.

The schedule creator 329 generates one or more schedules based on the received instructions and/or based on other information. The schedule may initially be created in a non-compact format that may be empty. A generated schedule includes one or more events or actions, for one or more devices. Each event may include a date for the event, a start time for the event, an end time for the event, an attribute or property associated with the event, an update to be made to the attribute or property for the event, one or more commands to execute for the event, and so on. The schedule creator 329 can generate a separate schedule for each device associated with the received instructions 320. Alternatively, schedule creator 329 may generate a single schedule that includes events for multiple different devices, or may generate a single schedule that includes events that will apply to multiple devices. In an example, an instruction that specifies a time to turn on all the lights at a location may include multiple device events. Alternatively, a separate schedule may be generated for each of the lights. Alternatively, a single schedule may be associated with each of the lights, and that same schedule may be applied to each of those lights.

Some devices do not include a scheduler module 351. Such devices may be managed by a gateway device, which may apply a schedule on behalf of those devices. Schedules created for gateway devices may include additional information that may not be included in schedules to be executed on an endpoint device. In one example, a schedule to be implemented by a gateway device on behalf of another device managed by the gateway device may include one or more unique identifiers of the endpoint device (e.g., a serial number, MAC address, network address, etc. of the endpoint device).

Translator 325 translates generated schedules into translated schedules 301 having a compact format. Translator 325 can significantly reduce the size of the schedule by translating the schedule into the compact format. To perform the translation, the translator 325 employs a predefined scheme to encode details of each event. The scheme may be based on a table, cipher or other encoding data shared by the schedule creator 329 and the scheduler module 351. Translating the schedule into a compact format allows the schedule to be efficiently transmitted (using less bandwidth and/or connection time) and stored (using less memory).

In one embodiment, the predefined format is a binary string that contains the basic event information (e.g., start time 305, end time 306, frequency 307, device property 308 to be updated, etc.) compactly arranged in a specified arrangement. The translated schedule is formatted in a way that is easy for an embedded system or gateway device to efficiently store and interpret. In an embodiment, the translated schedule contains a series of bits or bytes that represent the event information. Each schedule parameter may be encoded as a pre-defined byte. In one embodiment, event information can be formatted in machine language (e.g., operation code). For example, version can be formatted as opcode 0x01 in a first byte, days as opcode 0x02 in a second byte, and so on. A concatenation of bytes can then be base-64 encoded into an extensible markup language (XML) or JavaScript Object Notation (JSON) payload.

Schedule creator 329 transmits the translated schedule(s) 301 to the scheduler module 351 of the embedded system via a network connection during a period of connectivity. In an embodiment, schedule creator 329 can also transmit a time signal 326 as part of the translated schedule 301 or separately. Time signal 326 can be a timestamp or some other time data to identify a current time that can be used by an internal timer of the embedded system. Time signal 326 can also synchronize embedded systems and/or a gateway device with a server computing device in order to coordinate events.

Translated schedule(s) 301 can include a start time 305, an end time 306, a frequency 307, device property 308, and/or other information. Translated schedules 301 can also include a schedule version, a valid days indicator (indicating which days the schedule is valid for), a time zone indicator, a delivery instruction, an alternate days schedule, an alternate start time, an alternate end time, an device first function operator, a device function attribute, a second device function operator, a second device function attribute, and so on. In one embodiment, the schedule is formatted in a postfix manner in which operation/function follows arguments. A device property 308 can include a device function operator to identify the functionality of the device to trigger (e.g., the action to perform on the device or the command to generate for the device). For non-binary device functionality, a device function attribute may be included to identify the state a property should be changed to. For example, when a set of lights is scheduled to be dimmed at a specified time, the device function operator may indicate the event is for lighting control and the device function attribute can communicate the level of brightness for adjusting the lighting.

In one embodiment, generated compact schedules have a format as provided in the following example. The compact schedule is shown in an expanded form below for clarity. In one embodiment, the generated compact schedules have a post-fix order. Accordingly, AND and OR commands may combine a previous two conditions preceding the AND and OR commands in the compact schedule's stack into one, and PUSH commands duplicate on a top of the stack.

| | |
|---|---|
| version 1 | / version |
| days 2,3,4,5,6 | / first days to apply event |
| time__after 10:00:00 | / first start time for event |
| AND | |
| UTC 0 | / time zone or format or base for event |
| AND | |
| time__before 17:00:00 | / first end time for event |
| AND | |
| PUSH | / delivery instruction for event |
| days 1,7 | / second days for event |
| time__after 11:00:00 | / second start time for event |
| AND | |
| time__before 23:00:00 | / second end time for event |
| AND | |
| OR | |
| at__start | |
| set__prop (sprinkler=1) | / start operation instruction (device property) for event |
| at__end | |
| set__prop (sprinkler=0) | / end operation instruction (device property) for event |

In the above example schedule, the format starts by defining the parameters of the schedule. The example is for a schedule that runs from 10 AM to 5 PM on weekdays and from 11 AM to 11 PM on weekends. The parameters are followed by scheduled actions that are to be executed. In this case, a sprinkler is to turn on at 10 AM on weekdays and 11 AM on weekends, and is to turn off at 5 PM on weekdays and at 12 PM on weekends.

A schedule may also specify that an action is to be performed as long as a specified parameter is in a given range (e.g., so long as a time is between 10 AM and 5 PM). For such a parameter, if for some reason an action didn't happen at the start time that action may be initiated at some later time that is within the given range.

Scheduler module 351 can reside on a remote target device or gateway device as firmware and/or software that includes instructions for processing the schedule and generating commands at appropriate times. Scheduler module 351 can include a parser 352, duration calculator 353, timer 354, and/or command generator 355. Parser 352 parses a translated schedule 301 to identify the encoded event information by reading the opcode, XML, JSON, etc. based on knowledge of the predefined encoding used to generate the translated schedule 301. From the identified event information, scheduler 351 can select a first event as the soonest event scheduled to execute in view of time signal 326 and/or a current time known to the scheduler 351.

In one embodiment, duration calculator 353 can use the determined current time to determine a next scheduled event having a soonest start time. Duration calculator 353 can then notify timer 354, which can queue a command for the next event to be executed at the specified time. Timer 354 can use an internal clock or counter of the embedded system or gateway device to wait until the specified time occurs. In one embodiment, an embedded system may lack access to an available internal clock and employ ticks to track the time until the specified time to trigger the first event. For example, scheduler 351 can use processor cycles of the embedded system to calculate a number of ticks (i.e., duration) until the start time 305 associated with the scheduled event. Timer may track the ticks until the calculated number is reached.

Once timer 354 determines that an event is to be triggered, timer 354 causes command generator 355 to generate a start command (or end command) associated with the event. In one embodiment, the attribute of the device associated with an event may only have a single binary function, and the command is predetermined by the state of the device. For example, the command can be a pulse command to switch a current state of the device from on to off or off to on. In another embodiment command generator 355 generates the command based on a device property value identified from the parsed data. For example, the command generator 355 may generate a command to turn a heater on and set a temperature. Events may have a duration. For such events, timer 354 may track an amount of time since an event start command was generated, and after a specified duration has elapsed cause command generator to generate an event end command. The event end command may be a command to return an attribute modified by the event to an original state, or to set the attribute to a new final state indicated in the event.

Scheduler module 351 causes the command 360 associated with the event to be executed at the specified time. For a scheduler module 351 of an embedded system, this may include sending the command to a host controller of the embedded system. For a scheduler module 351 of a gateway device, this may include sending the command to a remote device managed by the gateway device. Therefore, the embedded system performs the operations or actions of the event even in the absence of connectivity to the server computing device at the specified time of the event. After the first event is triggered, scheduler 351 can identify the next event and cause timer 354 to queue the next event.

Figure 4A:
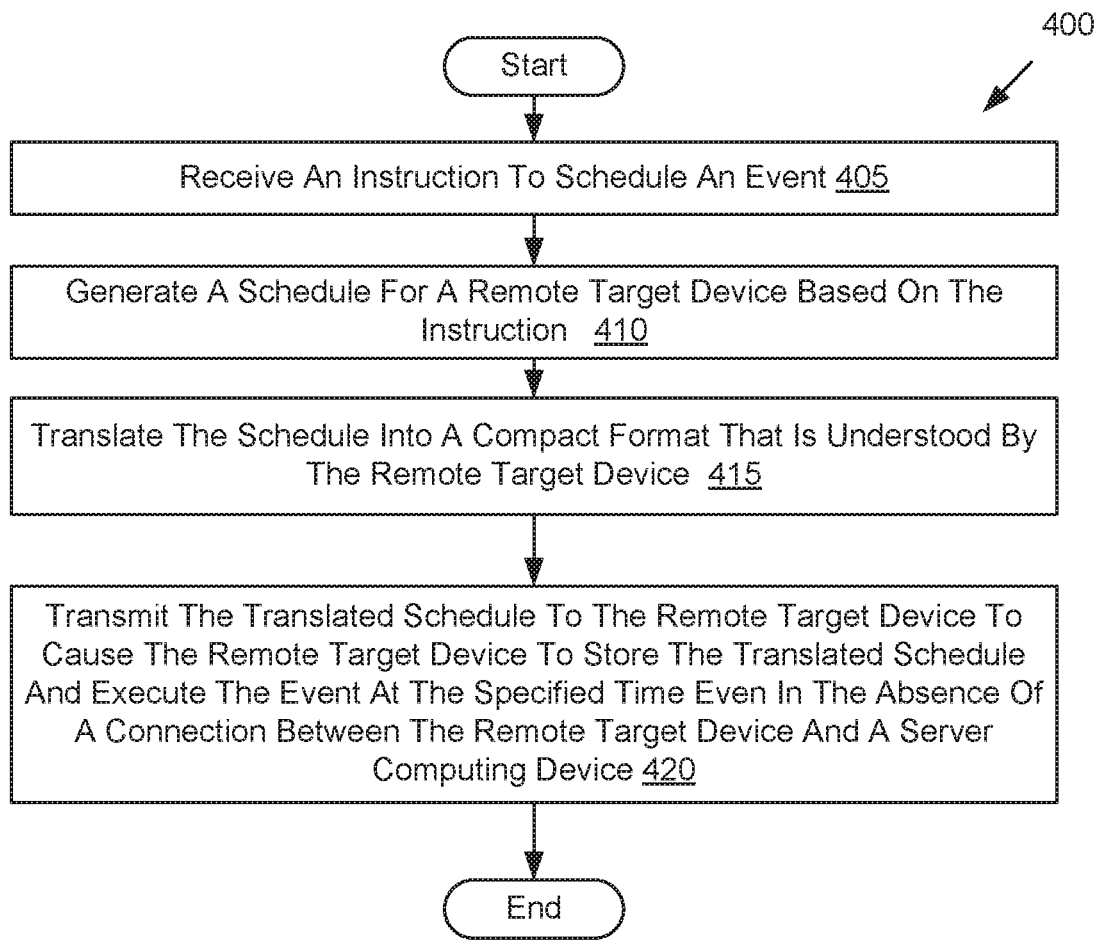
FIG. 4A is a flow chart of an example method of scheduling one or more events to execute on a remote device even in the absence of a connection.
Figure 4B:
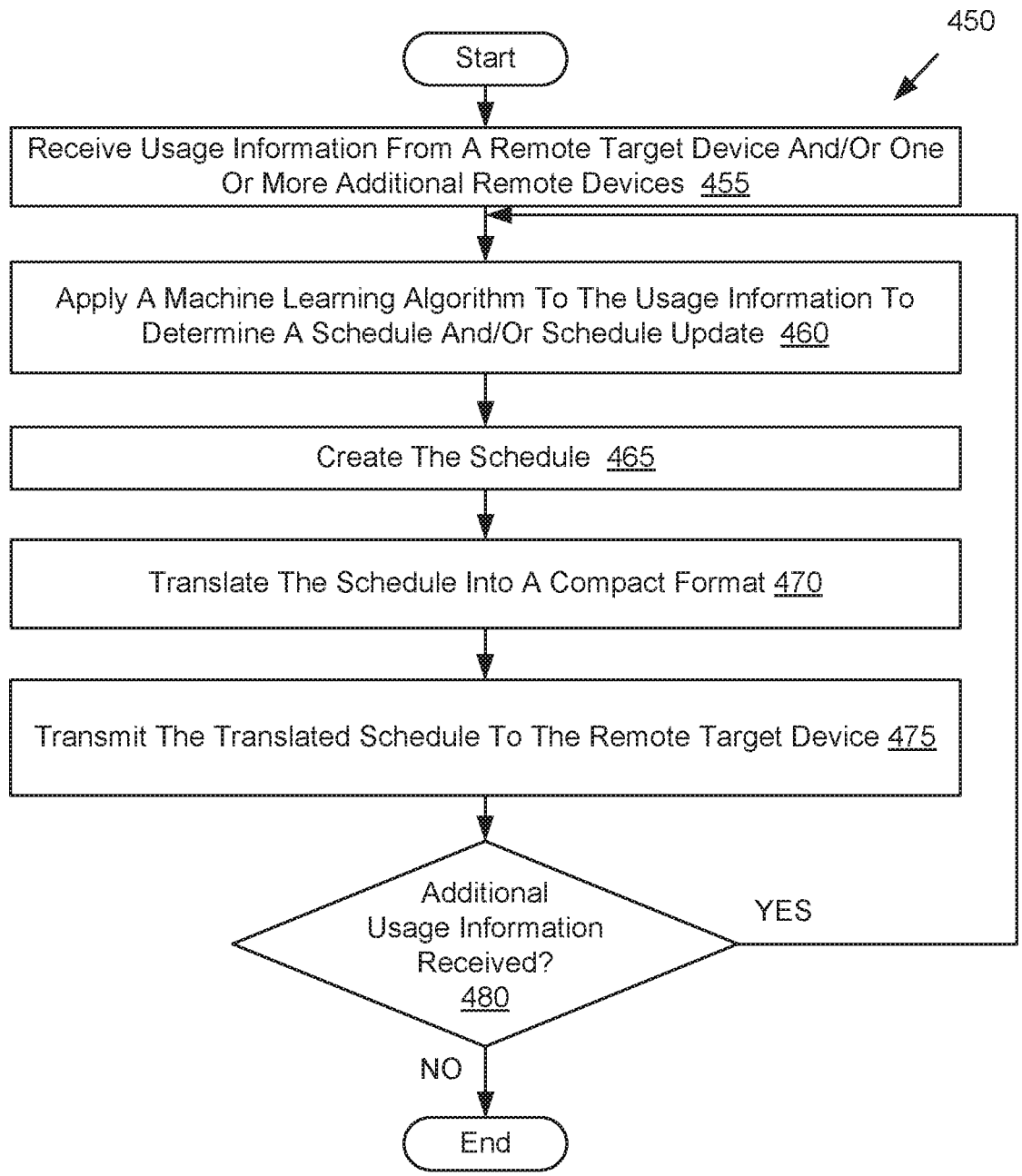
FIG. 4B is a flow chart of an example method of using machine learning to schedule one or more events to execute on a remote device even in the absence of a connection.

FIGS. 4A-B are flow diagrams showing various methods of creating and transmitting a schedule in accordance with embodiments of the present invention. The methods may be performed by a processing logic that may comprise hardware (e.g., circuitry, dedicated logic, programmable logic, microcode, etc.), software (e.g., instructions run on a processing device), or a combination thereof. Various embodiments may be performed by a schedule creation module (e.g., schedule creator 129 of FIG. 1) executing on a server (e.g., server computing device 125A of FIG. 1).

FIG. 4A is a flow chart of an example method 400 of scheduling one or more events to execute on a remote device even in the absence of a connection between the remote device and a server. At block 405 of method 400, processing logic receives instructions to schedule an event associated with a remote target device. The event may be to change a device state (e.g., to turn a light on), change a device setting (e.g., a temperature setpoint of a thermostat), or other event associated with a device. Other types of events are events to trigger rules, events to enable, disable or modify preexisting schedules, and so on. The instruction can include additional parameters such as an event frequency for repeating the event, a condition to be met prior to executing the event, or other logic associated with executing the event. In one embodiment, a single instruction can include multiple events for a remote target device or multiple remote target devices.

At block 410, processing logic generates a schedule for a remote target device based on the instruction. The generated schedule can include a series of events for the remote target device. Each event in the schedule can include a start time, an end time, a duration, a device property, an action indicator, a setting indicator, and/or other parameters associated with the remote target device.

At block 415, processing logic translates the schedule into a compact format that is understood by the remote target device. The translated schedule is formatted in a way that is easy for the device to efficiently store as well as interpret. The translated schedule can have a predefined format (i.e. predetermined encoding), such as a binary string, that contains the basic event information compactly arranged. In an embodiment, the translated schedule contains a series of bits or bytes in a predefined arrangement that represent the event information. In one embodiment, event information can be formatted in machine language (e.g., operation code). For example, version can be formatted as opcode 0x01, days as opcode 0x02, and so on. The concatenation of bytes can be base-64 encoded in an XML or JSON payload.

At block 420, processing logic transmits the translated schedule to the remote target device. The remote target device can then store the translated schedule and execute the event at the specified time even in the absence of a connection between the remote target device and the server computing device executing the processing logic.

FIG. 4B is a flow chart of an example method 450 of using machine learning to schedule one or more events to execute on a remote device even in the absence of a connection. Processing logic may apply method 450 to automatically generate and/or update schedules for devices based on observed behavior and usage patterns.

At block 455 of method 450, processing logic receives usage information from a remote target device and/or one or more additional remote devices. The remote target device may be a device for which the schedule is to be generated. Additional remote devices may be devices that are on a same LAN as the remote target device, devices owned by a same entity as the remote target device, devices in a same location (e.g., same household) as the remote target device, and/or devices otherwise associated with the remote target device. Usage information may additionally be received from a third-party service. For example, a device owned by a user may be manufactured by a company that has its own cloud service. That cloud service may collect usage information about the device, and may provide the usage information to processing logic. Thus, processing logic may use information from third-party controlled devices and third-party services to determine schedules for devices controlled by the processing logic.

At block 460, processing logic applies a machine learning algorithm to the usage information to determine a schedule and/or schedule update. Examples of machine learning algorithms that may be used include vector machine learning (VML) such as support vector machines (SVM), artificial neural networks, Bayesian networks, hierarchical clustering, and so on. In an embodiment, the machine learning algorithm can receive usage information (e.g., usage information 328 of FIG. 1) to train identifying correlations between behaviors of devices. For example, if a user frequently sets his thermostat to 75 degrees at 8 AM, then processing logic may determine that a scheduled event for setting the thermostat to 75 degrees at 8 AM is appropriate.

As indicated, usage information from one or more additional devices may be used to determine a schedule for a target device. Additionally, the usage information may include input from multiple sources, for example WAN-accessible services (e.g., 130 of FIG. 1) or third-party services (e.g., 162 of FIG. 1). Accordingly, processing logic is not limited to only the usage information for the device itself in determining a schedule for that device.

The machine learning algorithm is a process in which behaviors are extracted from usage information and statistical analysis is performed on the contents to schedule events for one or more remote target devices. The usage information can include both positive examples of behaviors that indicate an event to schedule and negative examples of behaviors that indicate not to schedule the event. The machine learning algorithm analyzes the usage information using machine learning (e.g., vector machine learning) to develop a profile of behaviors associated with one or more devices. For example, analyzed usage information can identify a bedroom light is routinely turned on at a certain time and the machine learning algorithm can schedule an event for the light to turn on at the certain time.

In one embodiment, a user may select data for the usage information via the user interface. The machine learning algorithm can identify positive examples and negative examples to be presented to the user to confirm via the user interface. Once a threshold number of positive examples and negative examples have been added to an event learning data set, the processing logic can track one or more quality metrics, such as a false positive behavior, a false negative behavior, accuracy calculation, and rule creation. For example, a false positive behavior can be tracked when a machine learning algorithm scheduled the event to turn on a light and an atypical amount of time passes before the light is turned off. The machine learning algorithm determines whether the analysis results show that the behavior meets one or more scheduling thresholds. When the results meet the scheduling threshold, then the processing logic determines to add the event a schedule and the method proceeds to block 465.

At block 465, processing logic creates the schedule. At block 470, the schedule is translated into a compact format. At block 475, the server computing device transmits the translated schedule to the remote target device.

At block 480, if additional usage information is received, the method can repeat the process 460-475. Otherwise, the method can end.

In addition to using usage information to generate and update schedules, usage information may also be used to trigger rules. Such rules may be set up by a user, or may themselves be automatically created using machine learning based on usage behavior patterns. The usage information can be data from another embedded system at the location or a third-party system including, for example, a feedback reading from motion sensors, televisions, appliances, etc. For example, a remote target device may be installed at a household location and, usage information from the remote target device and/or from other devices at the household location can indicate an occupancy behavior to determine when the house is empty.

The machine learning algorithm can analyze the usage information to determine whether the household is empty. In this example, failure to detect movement, television usage, and/or a refrigerator opening for a threshold period of time can indicate a vacation schedule. The threshold amount of time can also be determined based on usage information.

Processing logic may apply the information that the household is empty to a rule, which may dictate that certain schedules are to be disabled while the household is empty and/or that certain schedules are to be enabled when the household is empty. In accordance with the rule, processing logic may then send an instruction to a scheduler of a gateway device or an endpoint device to disable and/or enable specific schedules. Alternatively, or additionally, processing logic may send instructions to enable or disable specific events in schedules.

Figure 5:
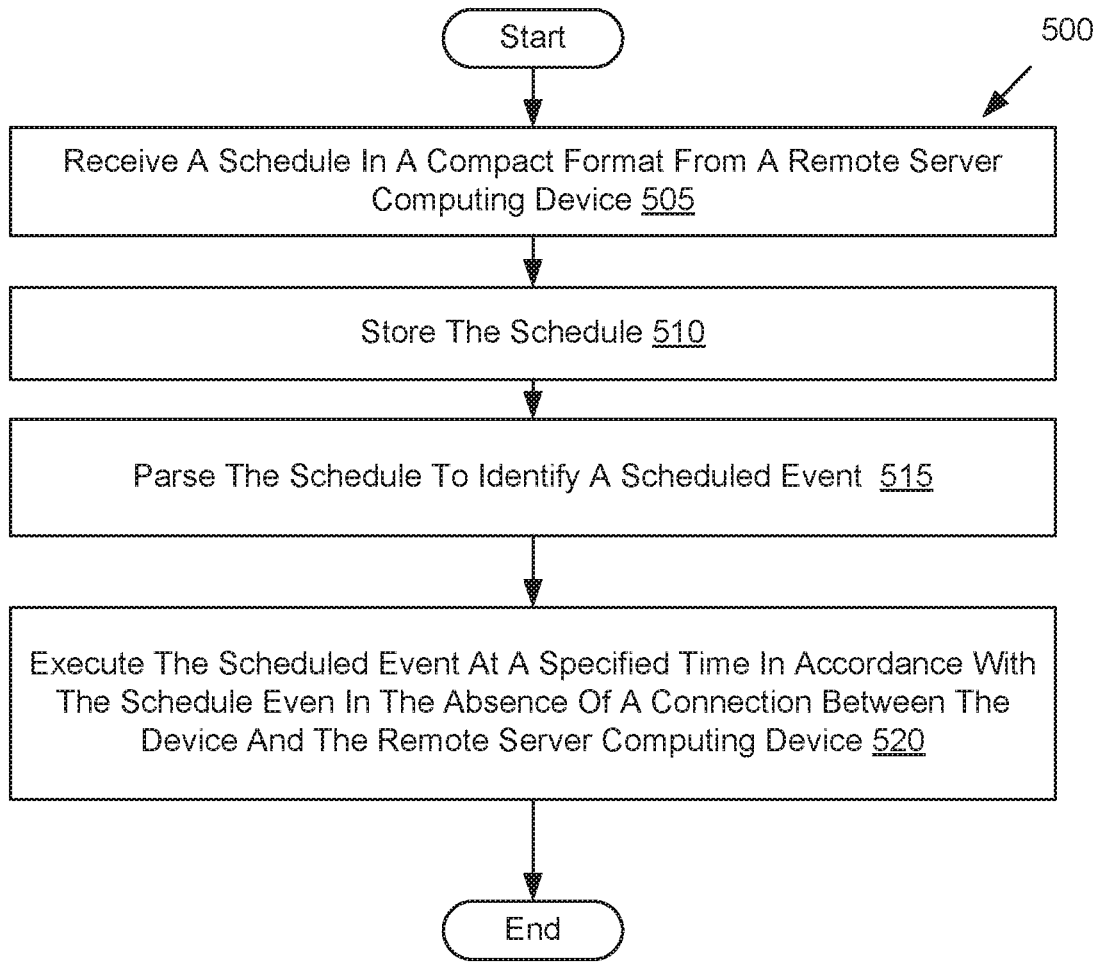
FIG. 5 is a flow chart of an example method of using a translated schedule on a remote device to execute events even in the absence of a connection.

FIG. 5 is a flow chart of an example method 500 of using a translated schedule on a remote device to execute events even in the absence of a network connection. The method may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a scheduler module (e.g., scheduler 151A, 151B, 191 of FIG. 1) executing on a device having an embedded system and/or on a gateway device (e.g., device 135A-B, gateway device 190 of FIG. 1).

At block 505 of method 500, processing logic receives a schedule in a compact format from a remote server computing device. In one embodiment, the remote server computing device can be a gateway device. The compact format can be in a binary format that encodes a start time, an end time, a device property, a frequency, and/or other information. In one embodiment, a time signal can be included with the schedule or in a separate message. At block 510, processing logic stores the schedule. At block 515, processing logic parses the schedule to identify a scheduled event. At block 520, processing logic executes the event at a specified time in accordance with the scheduled event even in the absence of a connection between the device and the remote server computing device. Executing the event may include generating a command to perform a property update identified in the event.

Figure 6:
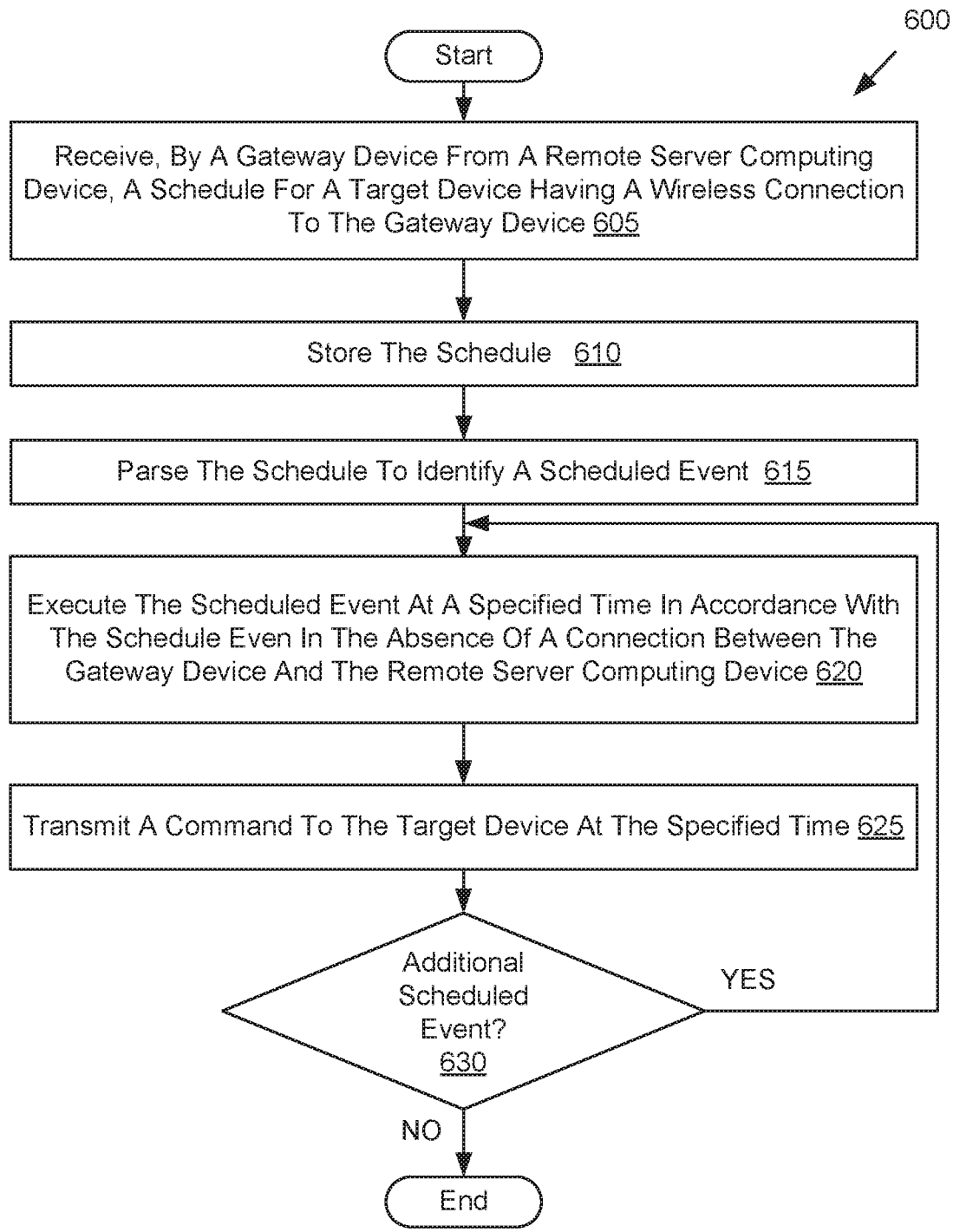
FIG. 6 is a flow chart of an example method of using a translated schedule on a gateway device to execute events on a remote device.

FIG. 6 is a flow chart of an example method 600 of using a translated schedule on a gateway device to execute events on a remote device. The method may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a scheduler module on a gateway (e.g., scheduler 191 and gateway device 190 of FIG. 1).

At block 605 of method 600, processing logic receives a schedule for a target device having a wireless connection to the gateway device. At block 610, processing logic stores the schedule. At block 615, processing logic parses the schedule to identify one or more scheduled events. At block 620, processing logic executes the scheduled event at a specified time in accordance with the schedule even in the absence of a connection between the gateway device and the remote server computing device. At block 625, processing logic transmits a command to the target device at the specified time. The device will then execute the command to perform a property update in accordance with the scheduled event. At block 630, processing logic determines if another event is scheduled. To execute the next event, processing logic repeats blocks 620, 625, and 630. Otherwise, the method can end.

Figure 7:
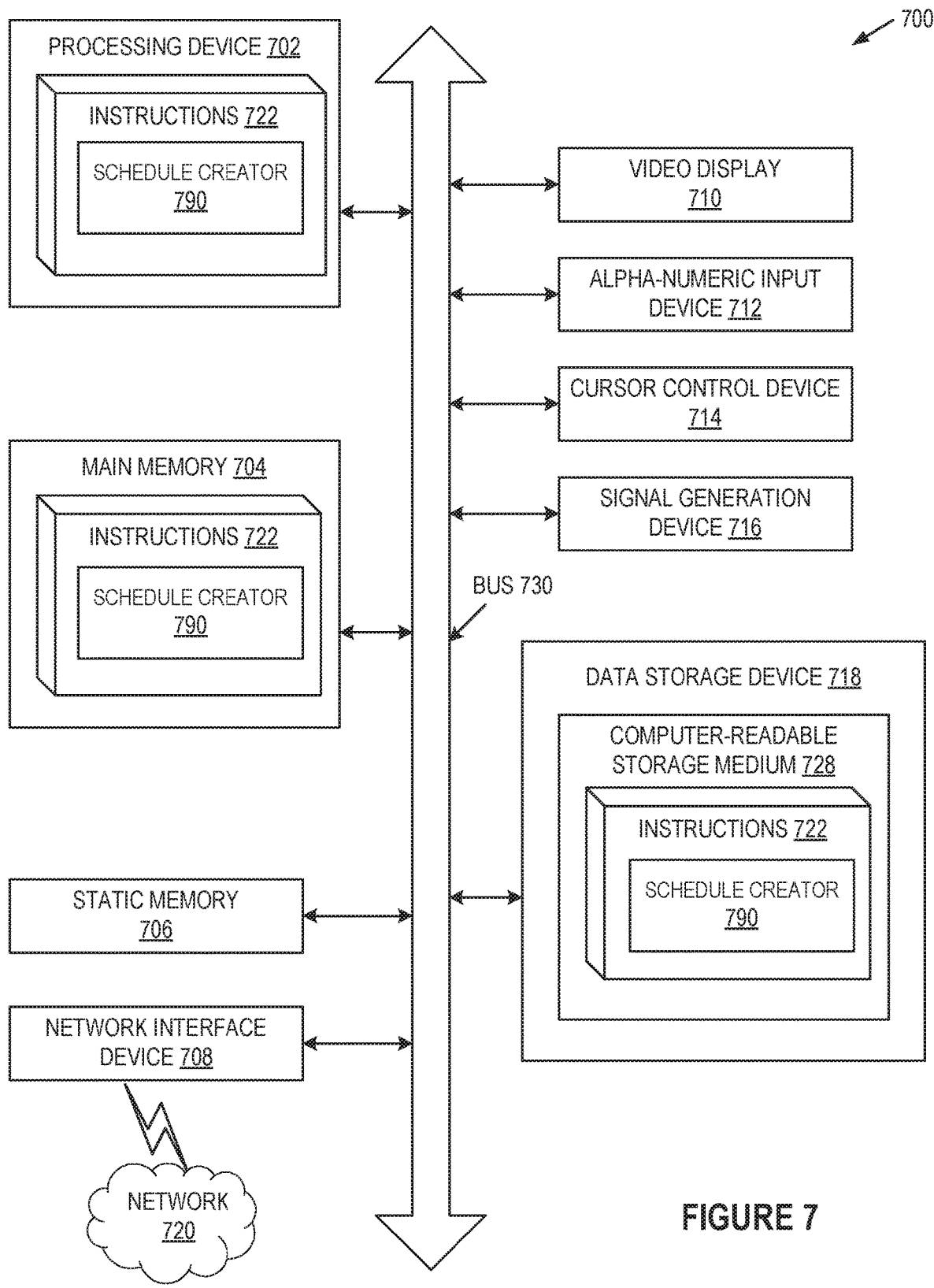
FIG. 7 illustrates a block diagram of one embodiment of a computing device.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium (or more specifically a non-transitory computer-readable storage medium) 728 on which is stored one or more sets of instructions 722 embodying any one or more of the methodologies or functions described herein. The instructions 722 may also reside, completely or at least partially, within the main memory 704 and/or within the processing device 702 during execution thereof by the computing device 700, the main memory 704 and the processing device 702 also constituting computer-readable storage media.

The computer-readable storage medium 728 may also be used to store a schedule creator 790 (as described with reference to FIGS. 1-3), and/or a software library containing methods that call a schedule creator 790. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICs, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "translating", "transmitting", "encoding", "applying", "updating", "executing", "sending", "storing", "parsing", "assigning", "determining", "scheduling", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    establishing, by a processing device, a connection with a third-party service;
    receiving, from the third-party service, an instruction to schedule an event associated with a remote target device, wherein the remote target device is installed at a location, and wherein receiving the instruction comprises receiving the instruction via an Application Programming Interface (API) from the third-party service, and wherein the third-party service is not installed at the location;
    generating a schedule for the remote target device based on the instruction;
    transmitting the schedule to the remote target device, wherein the transmitting causes the remote target device to store the schedule;
    receiving usage information from the remote target device and additional usage information generated by one or more additional remote devices also installed at the location;
    applying a machine learning algorithm to the usage information and the additional usage information to determine an update to the schedule, wherein the usage information comprises one or more positive examples of behaviors that indicate an event to schedule and one or more negative examples of behaviors that indicate an event not to schedule;
updating the schedule; and
transmitting the updated schedule to the remote target device, wherein the transmitting of the updated schedule causes the remote target device to store the updated schedule and execute the event at a specified time in accordance with the updated schedule, wherein the event is executable by the remote target device even in the absence of a connection between processing device and the remote target device.

2. The method of claim 1, wherein the remote target device is a gateway device or network-connected device comprising an embedded system.

3. The method of claim 1, wherein the additional usage information is received from a third-party system that manages the one or more additional remote devices.

4. The method of claim 1, wherein execution of the event comprises activation of at least one of a rule associated with the remote target device or an additional schedule associated with the remote target device.

5. The method of claim 1, wherein the location is a household, the method further comprising:
receiving an indication from the one or more additional remote devices that the household is unoccupied; and
sending a message to the remote target device to cause the remote target device to disable execution of the event or translated schedule.

6. The method of claim 1, wherein the third-party service comprises a third-party Internet of Things (IoT) cloud service.

7. A method, comprising:
receiving, by a processing device, an instruction to schedule an event associated with a remote target device that comprises an embedded system, wherein the event comprises a change to a state of one or more properties of the remote target device;
generating a schedule for the remote target device based on the instruction;
translating, by the processing device, the schedule into a compact format using encoding data that associates meanings with specific bytes in the compact format, wherein the compact format comprises a binary format, and wherein translating the schedule into the compact format comprises encoding the schedule into the binary format, the binary format comprising encodings for at least one of a start time, an end time, a device property, or a frequency; and
transmitting a message comprising the translated schedule in the compact format to the remote target device to cause the remote target device to store the translated schedule, parse the translated schedule to identify the event, and execute the event while the remote target device is disconnected from the processing device at a specified time in accordance with the translated schedule.

8. The method of claim 7, wherein the remote target device is a gateway device or network-connected device comprising an embedded system.

9. The method of claim 7, wherein receiving the instruction comprises receiving the instruction via an Application Programming Interface (API) from a third-party service, the method further comprising:
establishing a connection with the third-party service.

10. The method of claim 7, further comprising:
receiving usage information from the remote target device and additional usage information generated by one or more additional remote devices also installed at a location, wherein the additional usage information is received from a third-party system that manages the one or more additional remote devices;
generating an updated translated schedule based on the usage information; and
transmitting a second message to the remote target device, the second message comprising the updated translated schedule.

11. The method of claim 7, wherein execution of the event comprises activation of at least one of a rule associated with the remote target device or an additional schedule associated with the remote target device.

12. The method of claim 7, wherein the remote target device is installed at a household, the method further comprising:
receiving an indication from an additional remote device also installed at the household that the household is unoccupied; and
sending a message to the remote target device to cause the remote target device to disable execution of the event or translated schedule.

13. A computing device comprising:
a memory; and
a processing device operatively coupled to the memory, wherein the processing device is to:
receive an instruction to schedule an event associated with a remote target device that comprises an embedded system, wherein the event comprises a change to a state of one or more properties of the remote target device;
generate a schedule for the remote target device based on the instruction;
translate the schedule into a compact format using encoding data that associates meanings with specific bytes in the compact format, wherein the compact format comprises a binary format, and wherein translating the schedule into the compact format comprises encoding the schedule into the binary format, the binary format comprising encodings for at least one of a start time, an end time, a device property, or a frequency; and
transmit a message comprising the translated schedule in the compact format to the remote target device to cause the remote target device to store the translated schedule, parse the translated schedule to identify the event, and execute the event while the remote target device is disconnected from the processing device at a respective specified time in accordance with the translated schedule.

14. The computing device of claim 13, wherein the remote target device is a gateway device or network-connected device comprising an embedded system.

15. The computing device of claim 13, wherein receiving the instruction comprises receiving the instruction via an Application Programming Interface (API) from a third-party service, and wherein the processing device is further to:
establish a connection with a third-party service.

16. The computing device of claim 13, further comprising:
receiving usage information from the remote target device and additional usage information generated by one or more additional remote devices also installed at a location, wherein the additional usage information is received from a third-party system that manages the one or more additional remote devices;

generating an updated translated schedule based on the usage information; and transmitting a second message to the remote target device, the second message comprising the updated translated schedule.

17. The computing device of claim 13, wherein execution of the event comprises activation of at least one of a rule associated with the remote target device or an additional schedule associated with the remote target device.

18. The computing device of claim 13, wherein the remote target device is installed at a household, and wherein the processing device is further to:

receive an indication from an additional remote device also installed at the household that the household is unoccupied; and send a message to the remote target device to cause the remote target device to disable execution of the event or translated schedule.

* * * * *